March 30, 1937.  A. H. WELLENSIEK  2,075,561
ROTARY ENGINE
Filed Dec. 6, 1932  3 Sheets-Sheet 1
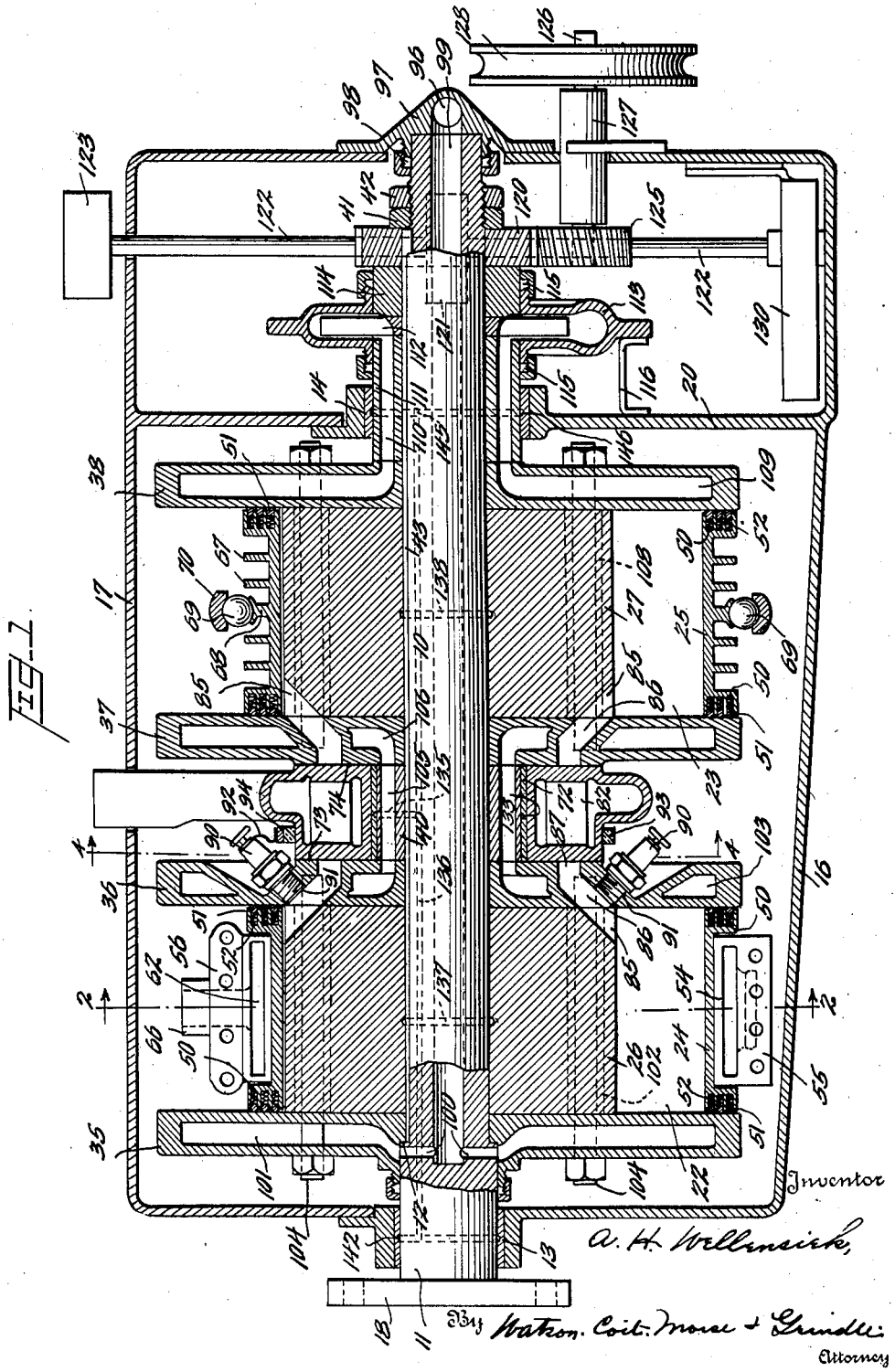

March 30, 1937.  A. H. WELLENSIEK  2,075,561
ROTARY ENGINE
Filed Dec. 6, 1932  3 Sheets-Sheet 2
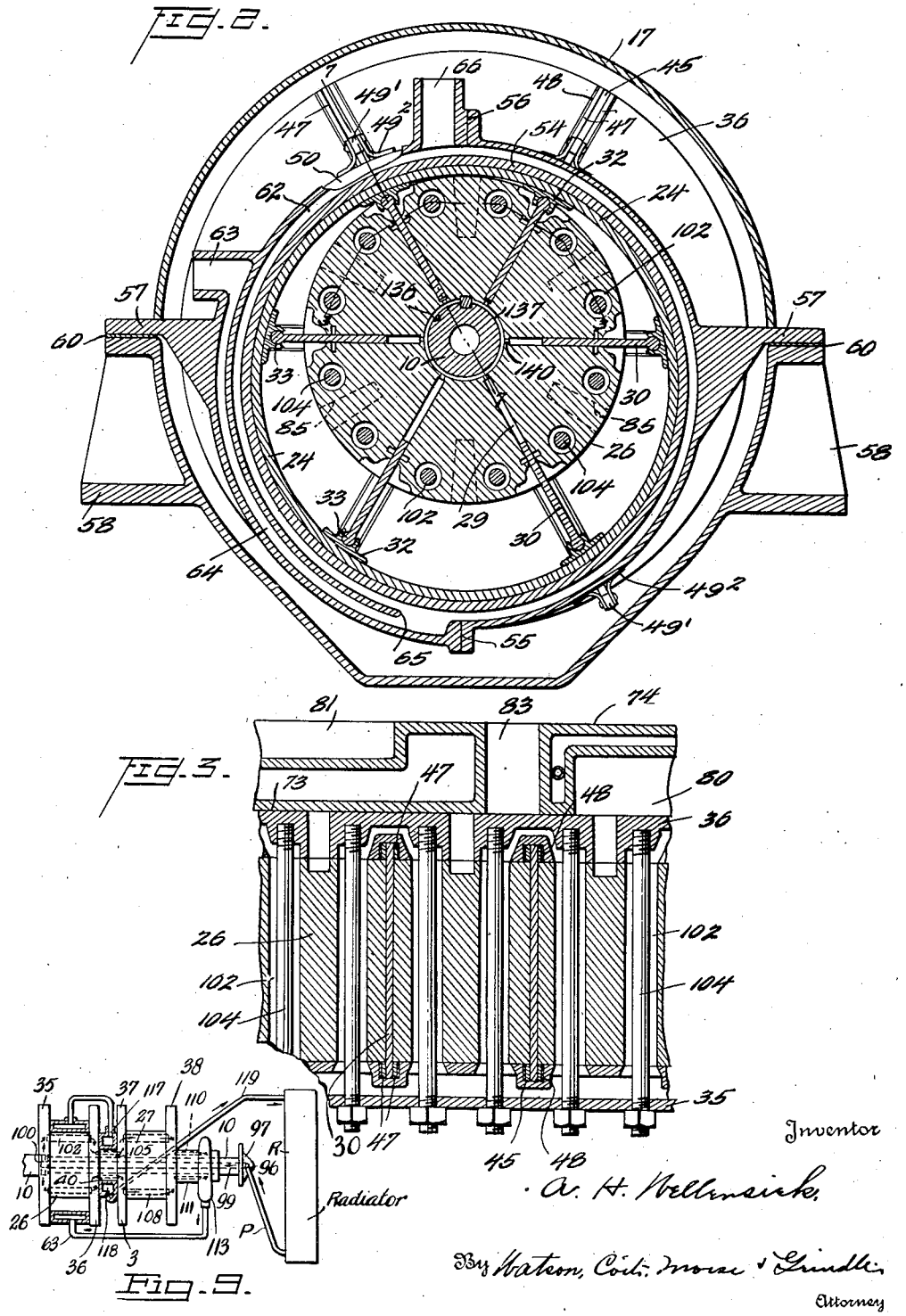

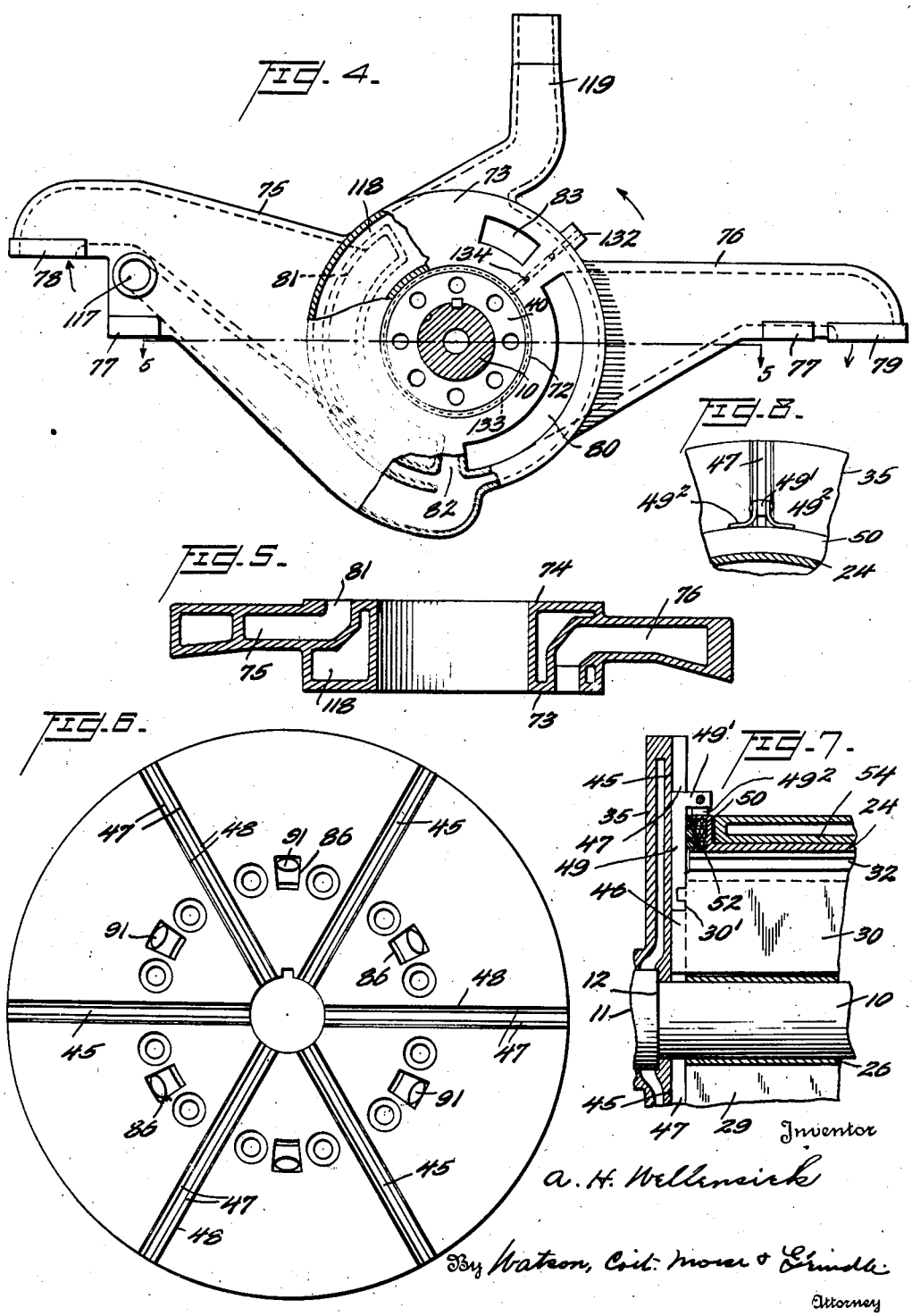

Patented Mar. 30, 1937

2,075,561

UNITED STATES PATENT OFFICE 2,075,561

ROTARY ENGINE

Adolph H. Wellensiek, Washington, D. C.

Application December 6, 1932, Serial No. 645,995

14 Claims. (Cl. 123—16)

This invention relates to rotary internal combustion engines and/or compressors or pumps, and more particularly to such devices in which the gases are compressed, expanded or the like in compartments between radial vanes extending from a central hub to an eccentrically mounted cylinder.

It is a general object of the present invention to provide novel and improved internal combustion engine and compressor construction.

More particularly it is an object of the invention to provide an internal combustion engine of the rotary type wherein similar units mounted adjacent each other on the common shaft provide for the compression, expansion and exhaust strokes of the conventional two-cycle operation.

The invention includes rotary compressors and engines in which variable volume and pressure chambers are formed between a centrally rotating core and a larger diameter cylinder mounted eccentrically thereto, and with the intervening crescent-shaped space enclosed by rotating end walls and divided into chambers by sliding partitions operating reciprocally in radial recesses in the core and engaging the closing end walls which thereby act as cranks to transmit the tangential force generated by pressure of the expanding gases in the chambers to the core and to the shaft carrying them.

Among the features of novelty of the present invention are the following:

1. To provide sliding contact between the cylinder and the end walls enclosing the ends of the cylinder and to have said end walls rotatable with the shaft.

2. To provide a rotating cylinder having a peripheral speed on its inside surface approximately equivalent to the mean peripheral speed of the outer edges of the sliding vanes which bear against it.

3. To provide a novel manifold between the pump and power cylinders to provide for intake to the pump, transfer of the compressed gases from the pump to the power cylinder and exhaust from the power cylinder as well as to provide therein ducts for cooling fluid.

4. To provide extended bearing surfaces for the sliding vane partitions beyond their engagement with recesses in the core to better transfer the power to the shaft and to provide more support for the vanes.

5. To provide novel means for cooling substantially all surfaces exposed to heat from compression and combustion.

6. To provide novel means for lubricating substantially all sliding surfaces on the inside of the engine as well as the shaft bearings, etc.

Other and further objects and features of the invention will be more apparent to those skilled in the art upon a consideration of the accompanying drawings and following specification, wherein is disclosed a single exemplary embodiment of the invention, with the understanding that such changes and variations may be made therein as fall within the scope of the appended claims without departing from the spirit of the invention.

In said drawings,

Figure 1 is a longitudinal vertical section through an engine constructed according to the present invention and containing a single power cylinder and a single pump cylinder;

Figure 2 is a transverse vertical section taken on line 2—2 of Figure 1 through the power cylinder;

Figure 3 is a fragmentary cylindrical section taken on line 3—3 of Figure 2, and showing the mounting of the vanes or partitions in the cores and the relationship of the power unit to the common manifold;

Figure 4 is a face view of the manifold shown by a section on line 4—4 of Figure 1, with parts broken away to disclose the internal structure;

Figure 5 is a horizontal section on line 5—5 of Figure 4, looking in the direction of the arrows, and showing the intake and exhaust passages in the manifold;

Figure 6 is a face view of the inner end wall of the power cylinder looking from the inside out;

Figure 7 is a fragmentary section similar to Figure 1, but taken on line 7—7 of Figure 2 to show the vanes and their cooperation with the end walls as well as the means to maintain the vanes pressed radially against the cylinder wall;

Figure 8 is a fragmentary detail view of the resilient slides of the vane guides; and Figure 9 is a wholly diagrammatic and schematic showing of the water circulating system.

The present embodiment of the invention is shown as comprising two units, a power cylinder and a pump cylinder, but it will be clear that these units can be multiplied indefinitely along the shaft and that, for instance, one pump cylinder may be equipped to supply two power cylinders, one on either side of it. Each cylinder represents a plurality of pumping elements or power elements, so that the present engine having two cylinders is the equivalent in impulses to a multi-cylinder engine of the conventional type. The engine shown has six vanes per cylinder, so that in the power cylinder there are six explosions per revolution, the equivalent of a six-cylinder two-cycle, or twelve-cylinder four-cycle engine in smoothness of operation.

The engine is built up about a straight central shaft 10 having the enlarged end 11 providing a shoulder 12 at the junction of the two parts. The end 11 is journalled in a bushing 13. A second bushing 14 provides support for the shaft near its opposite end. These bushings are mounted in web 20 and wall 20' in the lower part 16' of the housing or casing 16, which together with the removable upper or cover part 17 completely encloses all of the moving parts of the engine in an oil-tight manner.

At the left-hand end the shaft is shown as provided with a flange 18 for taking off power.

Between the web 20 and the left end wall 20' of the lower portion of the housing are arranged a pair of cylinder assemblies of substantially identical construction, that 22 at the left representing the power cylinder and that 23 at the right the compressor cylinder, for the engine is of the two-cycle, separate compressor type.

Each cylinder, so-called, includes a cylindrical wall 24, 25, respectively, mounted eccentrically to the shaft 10, as clearly seen in Figure 2, and permitted to rotate as will be further described. Within each cylinder is a central hub or drum 26, 27, respectively, coaxial with the shaft and of a lesser diameter than the cylindrical outer wall. As shown in Figure 2, the inner surface of this cylinder and the outer surface of the drum are almost tangential at the top but, by virtue of an adjustment to be later described, clearance at this point can be changed to suit operating conditions.

Each hub or drum is radially slotted throughout its full length and most of its radial depth with a plurality, here shown as six, of slots 29 for the accommodation of the radially sliding vanes or partitions 30, one of which fits in each slot and is movable therein so that its normal position is with its outer end against the inner wall of the corresponding cylinder. Each partition plate is greater in length than the axial length of its hub or drum, and each is provided on its outer edge with a sliding tip or shoe 32 articulated to the outer edge of the vane as at 33 so that its curved outer face may always engage the inner surface of the cylinder, to which curvature it is formed, throughout the whole surface of the shoe. The shoe is exactly the same length as the cylinder.

Each cylinder and its corresponding drum is equipped with a pair of end plates which define a crescent-like space between the drum and cylinder which is closed at the ends by the end plates and is divided into a series of varying sized compartments by means of the partition plates or vanes.

As seen in Figure 1, the power cylinder has an end plate 35 at its outside and a plate 36 at its inside, and the pump cylinder has a plate 37 at its inside and a plate 38 at its outside. The outside plates of each cylinder are substantially identical, as are the inside plates, although that to the power cylinder has, in addition to the ports provided for the pump cylinder, passages for the spark plugs which will be later described.

Each end plate has a plane inner surface which bears against the end surface of its hub and against the end surface of its cylinder. The parts are assembled on the shaft with 35 abutting the shoulder 12 on the shaft, then the hub 26, the plate 36, a collar 40, plate 37, hub 27, plate 38, additional collars later to be described, and the whole is drawn into position by a nut 41 and lock nut 42 threaded on the end of the shaft. A long key or spline 43 fits suitable grooves in the shaft and parts mounted thereon to hold all of these parts against rotation in relation to the shaft or each other.

As seen in Figure 6, the inner face of each end plate is radially grooved as at 45 for the reception of the projecting side edges of the partition plates or vanes. Figure 7 shows more clearly the manner of accomplishing this and shows the vane edge 46 projecting beyond the end of the shoe 32 and fitting into the groove 45. These grooves are provided with the liners 47, as best seen in Figures 3 and 6, which are backed by shims 48 which can be replaced to adjust for wear between the liners and the faces of the partition plates, thus insuring gas tightness at all times.

As shown in Figure 7, each of the partition plates 30 has the radial edge extension which moves in the grooves 45 notched as at 30' to interlock with the notched end of a member 49 of the same thickness as the plate and operating in the same groove. This member extends up through the groove beyond the wall of the cylinder 24 and is then turned inwardly to provide the end 49' which overhangs the peripheral flange 24' of the cylinder. As shown in Figure 8, on an enlarged scale, the end 49' is provided with a pair of springs 49² which are riveted thereto as shown and bear on the periphery of this flange on the cylinder. In this manner the vanes are resiliently maintained with their shoes bearing on the inner surface of the cylinder wall. The eccentricity of the cylinder and the drum requires movement of the vanes in the drum and this is effected by the action of the shoe on the cylinder wall and by the part 49.

The partitions are subject to the circumferential thrust resulting from the compression action in the pump cylinder or the expansion in the power cylinder, and by being supported for their full length in these grooves in the end plates, are not subject to canting in the hub recesses and more adequately transmit effort from the shaft in the case of the pump, and power from the partitions to the shaft through the end plates in the case of the power cylinder.

The cylindrical walls which have already been stated as rotatable, are supported as shown in Figs. 1 and 2. Each cylinder has peripheral edge flanges slotted circumferentially as at 50 to provide for the circular packing rings 51 pressed by the springs 52 into close engagement with the inner faces of the end plates to insure against leakage of gas from the cylinder compartments by the edges of the actual cylinder walls.

In the power cylinder the reduced diameter between these flanges is ground to a journal finish to be received in the supporting bracket member 54, best shown in Fig. 2, which is formed in two parts bolted together as at 55 and 56 and forms a bearing for the cylinder, holding it in its position eccentrically to the shaft.

This bracket has the mounting arms 57 extending substantially radially therefrom and secured to the casing 16, forming the main frame of the engine, just above the mounting arms 58 of this casing which provide for supporting the engine from any suitable part such as the frame of a vehicle. Shims 60 are provided between the arms 57 and the arms 58 in order to permit vertical adjustment of the position of the cylinder in respect to the central hub to vary the clearance between these two and hence to change the compression ratio of the engine. Suitable fastening means, not shown, connect these two parts together after the adjustment has been made, by varying the thicknesses of the shims 60.

The bracket 54 includes not only the bearing portion, but is hollow to provide for cooling the power cylinder, and for this purpose is provided with the water jacket space 62 the entrance to which is through the inlet pipe 63 by way of the passage 64, the water at the position 65 dividing and part moving upwardly to the left and part to the right through the passageway 62 to leave by the pipe 66.

The support for the pump cylinder, which is not water cooled, is simpler. This cylinder is provided with a series of radial fins 67 for cooling purposes and the central fin 68 is flanged and widened to form the inner race for a series of balls 69 which run in an outer race 70 which has arms, not shown, similar to those shown in 57 of Fig. 2, to be supported from the casing 16 and adjustable, as in the case of the power cylinder by the use of shims, to vary the compression of the compressor.

In order to provide for the supply of gaseous mixture or air to the compressor, for the transfer of this fluid when compressed to the power cylinder, and for the exhaust of the spent gases from the power cylinder, a manifold is provided between the two cylinders. It also forms an intermediate bearing for the shaft.

This manifold is shown best in Fig. 4, where it is seen as forming a support for the bushing 72 which journals the collar 40 mounted on the shaft and forming a spacer between the end plates 36 and 37. The central portion of the manifold has parallel plane surfaces 73 and 74 which bear respectively against the facing surfaces of the end plates 36 and 37 to provide gastight running fits. Arms 75 and 76 extend outwardly from this central portion and each is provided with a supporting pad 77 which is secured to the lower casing 16 along its upper reinforced edge to hold the manifold in position.

The arm 75 is hollow and provides for the intake of gas from the flange 78 which can be attached to any suitable form of carburetor or the like, while the arm 76 is hollow and provides for the exhaust gases to issue from the flange 79 to a suitable muffler or the like.

The exhaust passage leads from an exhaust port 80 in the face 73 which engages the end plate 36 and this port is about 135° annular extent. The intake passage 75 leads to a port 81 opening through the opposite face 74 of the manifold and extends approximately 150°, being of the same radius as the port 80 and only spaced slightly therefrom at the bottom as at 82 which provides a passage for water to the inner chamber of the manifold. Between the upper ends of the two ports is a transfer passage 83 having a port of short annular extent on each face of the manifold to provide for the straight through transfer of fluid from the pump to the power cylinder.

Each compartment of both the pump and power cylinders is connected to the outer face of its end plate which cooperates with the manifold as follows: Midway between the partition plates forming the compartment, the hub is provided with an inclined groove 85 which meets the passage 86 in the corresponding end plate which is inclined at the same angle and joins the passageway 87, normal to the outer face of this plate and having its port spaced from the shaft the same distance as the ports in the manifold. It will be seen that as the drums rotate, the compartments in the pump are brought successively into cooperation with the intake port 81 and then with the transfer port 83, whereas those in the power cylinder are brought first into cooperation with the transfer port and then with the exhaust port.

The direction of rotation is shown by the arrow in Fig. 4 and the operation of the device will now be considered. The pump cylinder has one of its compartments, which has just passed top position where its displacement is a minimum, brought into communication with the intake manifold through the registration of port 81 and a port in plate 37, and as this compartment moves downwardly it enlarges, as can clearly be seen from Fig. 2, thus drawing in a charge of fuel mixture until the compartment reaches the bottom, when it is cut off from communication with the intake manifold while at its maximum size. During most of the remainder of its revolution, during which the compartment is continually being restricted in size, the fuel charge is compressed until substantially a maximum pressure and minimum volume is attained, when communication is opened to the transfer port and the charge is delivered to the power cylinder. Each succeeding compartment in the pump cylinder works in the same manner, so that a charge is always being drawn in by at least two compartments and being compressed by at least two.

On the power cylinder side it will be seen that when the transfer port connects a charge under pressure in the pump compartment to the corresponding compartment of the power cylinder, a portion of this charge is transferred to the power cylinder under pressure, just prior to top center and as the compartment passes over top center the charge is fired and expands, forcing the drum to rotate in the direction of the arrow because of its eccentric mounting in the cylinder, since as the cylinder rotates in that direction the compartment enlarges and the effects of the expansion cause continued movement.

When the burning charge reaches the bottom where the compartment is at its maximum size, the port in its end plate coincides with the exhaust port in the manifold and the charge expands into the exhaust passage, after which the residue is continually driven out as the compartment is contracted on its movement toward the top of the cylinder until, just prior to connection with the transfer port, it is isolated from the exhaust port as the compartment is substantially clear of burned gases.

In order to fire the charge, each compartment in the power cylinder is provided with a spark plug 90 threaded into an aperture 91 extending at right angles to the passage 86 in the end plate. Each plug is provided with a contact spring 92 which bears on the periphery of an insulating ring 93 mounted on the outer surface of the central portion of the manifold. A block 94 of metal let into the surface of this ring at the proper position provides for conducting high tension current from a suitable spark coil, not shown, to the spark plug at the proper time.

By reference to Figure 3 supplemented by the diagrammatic Figure 9, the means for cooling the various parts of the engine will be fully understood. The radiator R, of conventional form, is connected by flexible pipe P to the inlet pipe 96 in the end cap 97 into which fits over the end of the shaft 10 and is provided with a stuffing box 98 to prevent leakage. This pipe 96 communicates with the central passageway 99 through the shaft 10 carrying the water to the far end, where it moves out through radial passages 100 into the hollow interior 101 of the end plate 35, cooling this plate and then passing through the passages 102 through the hub 26 to the cooling chamber 103 in the end plate 36. It may be mentioned here that the end plates for each cylinder are drawn securely against the ends of the corresponding drum by means of bolts 104 of smaller diameter than the passageways 102 and centrally in them. This construction is very clear from Fig. 3.

From the compartment 103 in the end plate 36 water passes axially into the series of holes 105 in the collar 40 which carries it to the water compartment 106 in the end plate 37 and thence through the passages 108 in the drum 27 to the compartment 109 in the end plate 38. Thence through the holes 110 in the journal collar 111 to the center of the pump impeller 112 mounted on the shaft and abutting the collar 111. Centrifugal force causes the impeller to throw the water outwardly into the pump housing 113 which is journalled on the collar 111, and the collar 114, and is equipped at each end with a suitable stuffing box 115 to insure water tightness between the collars and the housing. A bracket 116 secures the housing against rotation to the partition plate 20.

A hose carries water from the pump housing to the pipe 63 supplying water to the cylinder cooling bracket for the power cylinder. From here water may be conducted by a flexible pipe to the water inlet 117 in the manifold which delivers water to the cooling compartment 118 therein from whence it is discharged through the pipe 119 to be returned to the radiator.

Between the collar 114 and the nut 41 there is mounted on the shaft a spiral gear 120 which meshes with a gear 121 on the vertically mounted shaft 122 which carries at its upper end outside of the casing the ignition breaker apparatus 123, which may be of conventional form and serves to break the primary circuit of the spark coil at appropriate intervals to provide sparking for the cylinders. The gear 120 also meshes with a gear 125 on the shaft 126 journalled in the bearing 127 in the end wall of the casing 16. The shaft 126 carries a pulley 128 for the purpose of driving the fan belt and fan for cooling the radiator, as is customary in conventional automotive practice.

Mounted in the lower portion of the compartment formed by the web 20 and the right hand end wall of the main casing, is an oil pump 130 driven from the shaft 122 and adapted to withdraw oil from the sump 130' and pump it by means of piping, not shown, to the oil inlet duct 132 shown in the upper right of Figure 4. This duct passes radially inwardly through the material of the manifold and delivers oil into the circumferential groove 133 in the bushing 72 within the manifold. Lateral passages 134 insure the delivery of oil to the two faces of the manifold which cooperate with the end plates to insure lubrication between these moving surfaces.

From the circumferential groove 133 in the bushing 72 oil is delivered continuously into the radial groove 135 in the collar 40, which conducts it to a groove 136 extending substantially the full length of the shaft. This delivers oil into the circumferential grooves 137 and 138, respectively, at the centers of the cylinder hubs, and from these circumferential grooves oil is fed by small ducts 140, seen in Figure 2, to the slots in which the movable vanes reciprocate, thereby providing adequate lubrication for them; centrifugal force and natural seepage cause this oil to move outwardly and insure lubrication between the vanes and shoes and between the shoes and cylinder walls as well as between the cylinder packing rings and the end plates.

The longitudinal groove 136 in the shaft continues and feeds into the circumferential groove 142 in the bushing 13 for the left hand end of the main shaft. It also delivers oil by means of a radial groove 145 in the collar 110 which directs it into a circumferential groove 146 in the bushing 14 for lubricating this second main bearing.

In the manner just described, the entire engine is lubricated with the exception of those parts directly exposed in the crank case which always operate in more or less of a fog of oil which is thrown by the rotating parts in returning the oil to the sump to the left of the partition 20. From there, it travels through a duct, not shown, to the compartment to the right of this partition where it is taken up by the pump for further distribution.

Having thus described the invention, what is claimed as new and desired to be secured by Letters Patent is:

1. In a rotary device of the type described, in combination, a rotor, a cylinder eccentric to said rotor, a plurality of radially reciprocable partition plates extending between the rotor and cylinder and forming compartments whose size continuously changes during rotation, end members closing the cylinder and compartments, a totally enclosing casing and oil sump for the beforementioned parts, means supported from the said casing mounting the cylinder for rotation by frictional engagement with said plates, and a cooling fluid chamber for the cylinder incorporated in said mounting means independent of the casing.

2. In a rotary device of the type described, in combination, a rotor, a cylinder eccentric to said rotor, a plurality of radially reciprocable partition plates extending between the rotor and cylinder and forming compartments whose size continuously changes during rotation, end members closing the cylinder and compartments and secured to the rotor, means on the partition plates interlocking with the end members to provide gas tight joints and better plate support, means to adjust the fit between the partition plate means and the end members, and spring means to engage the outer surface of the cylinder and maintain the partition plates in engagement with the inner surface.

3. In a rotary device of the type described, in combination, a rotor, radial slots therein, a cylinder eccentric to said rotor, end plates rotatable with the rotor and cooperating with the cylinder ends, said plates being grooved coincident to the rotor slots, partitions slidable in said slots and grooves to divide the space between cylinder and rotor into compartments, a sleeve engaging the whole exterior of and supporting the cylinder for rotation under the friction of the end plates and partitions, and passages for a cooling medium in said sleeve to cool said cylinder.

4. In a rotary device of the type described, in combination, a rotor having radial slots and axial passages therein, a cylinder eccentric to said rotor, hollow end plates movable with said rotor and engaging the cylinder ends, partitions slidable in said slots and engaging the end plates to divide the space between cylinder and rotor in compartments of continuously varying size during rotation of the rotor, and means to deliver a cooling medium into one end plate, then through the said passages and into the other end plate.

5. In an internal combustion engine of the type described, in combination, a shaft, a pair of spaced rotors thereon, a cylinder for each rotor and eccentric thereto, end plates on each rotor closing the respective cylinder ends, radially slidable partitions in each rotor engaging the end plates and cylinder to provide a plurality of continuously variable volume compartments, a manifold between said rotors, a passage in said manifold to conduct combustible gas to one cylinder, a passage to conduct exhaust gases from the other cylinder, ports in said manifold and in the cooperating end plates, said ports being positioned to cause one cylinder assembly to act as a compressor and the other as a power cylinder, and a straight through transfer passage in said manifold to deliver compressed fluid from the compressor to the power cylinder compartments.

6. In an internal combustion engine, in combination, a shaft, a pair of longitudinally spaced cylinders mounted over and eccentric to said shaft, a composite rotor on said shaft for each cylinder and each including a radially slotted concentric hub, a pair of end plates closing the ends of each cylinder and partitions slidable in said slots extending to the inner surface of the cylinder and having their edges cooperating with the end plates to provide a plurality of compartments in each cylinder continuously variable in volume as the shaft rotates, a manifold stationary between said cylinders and having flat surfaces cooperating with the adjacent end plates, an intake passage in said manifold, a port in each said surface, a port in each adjacent end plate for each compartment, said plate and surface ports cooperating to connect each compartment to a manifold passage once per revolution.

7. In an internal combustion engine of the type described, in combination, a shaft, a pair of spaced rotors thereon, a cylinder for each rotor and eccentric thereto, end plates on each rotor closing the respective cylinder ends, radially slidable partitions in each rotor engaging the end plates and cylinder to provide a plurality of continuously variable volume compartments, a manifold between said rotors of less diameter than said plates and having intake and exhaust passages, ports therein and in the cooperating end plates, said ports being positioned to cause one cylinder assembly to act as a compressor and the other as a power cylinder, an open transfer passage in said manifold to deliver compressed fluid from the compressor to the power cylinder compartments, a spark plug for each power cylinder compartment extending through the inner end plate of the power cylinder outside the radius of the manifold, a contact adapted to be connected to an ignition system and mounted on but insulated from said manifold, and a cooperating contact on each plug to engage said first contact at the time for ignition of its charge.

8. In a rotary device of the type described, in combination, a shaft rotatable in fixed bearings, a pair of concentric hubs thereon, end plates on each hub extending radially beyond its surface, sliding partition plates operating in slots in each hub and cooperating with the respective end plates, a cylindrical shell surrounding each hub and fitting between said end plates, one cylindrical shell and its cooperating parts forming a power cylinder and the other a compressor, rigid means to independently support each shell for rotation about an axis eccentric to said shaft, and means to adjust the eccentricity of each shell independently to vary the compression of its cylinder.

9. In a rotary device of the type described, in combination, a shaft rotatable in fixed bearings, a concentric hub thereon, end plates on said hub extending radially beyond its surface, sliding partition plates operating in slots in said hub and cooperating with the end plates, a cylindrical shell surrounding said hub and fitting between said end plates, means surrounding said shell to support the same for rotation about an axis eccentric to said shaft, and means to adjust said shell support means in respect to said bearings to change the eccentricity of the hub and cylinder.

10. In a rotary device of the type described, in combination, a shaft rotatable in fixed bearings, a concentric hub thereon, end plates on said hub extending radially beyond its surface, sliding partition plates operating in slots in said hub and cooperating with the end plates, a cylindrical shell surrounding said hub and fitting between said end plates, means to support said shell for rotation about an axis eccentric to said shaft, the ends of said cylinder being circumferentially grooved, packing rings in said grooves, resilient means biasing said rings against said end plates, a water chamber in each end plate, water passages in the hub, a water passage in the shaft, and means connecting all said chambers and passages in series for cooling water.

11. In an internal combustion engine, in combination, a hollow shaft, a plurality of cylinder units secured on said shaft each comprising a hub and end plates, a cylindrical shell surrounding said parts and partition plates movable with said hub and engaging the shell, connecting water passages in the end plates and hub of each unit, a spacer bushing between end plates of adjacent end hubs, water passages therein connecting the end plate passages, means connecting the water passage of one end, end plate with the shaft bore, a water pump having an impeller directly on said shaft near the other end thereof, means rotatable with the shaft to conduct water to said impeller from the opposite end, end plate, and a stationary casing surrounding said impeller.

12. In an internal combustion engine, in combination, a rotatable shaft, a pair of cylinder units mounted thereon and each comprising a hub, end plates therefor, a cylindrical shell mounted eccentric to said hub, partitions engaging the hub, cylindrical shell and end plates, the compartments formed between the partitions continuously varying in size as the shaft rotates; means between the cylinders to connect the compartments of one unit to a source of gaseous fuel mixture as they are enlarging to fill them, means between the cylinders to isolate the compartments as they are contracting to compress the gas, means to transfer the gas when compressed to a contracted compartment in the other unit, means to then isolate this compartment, means between the cylinders to ignite the charge after such isolation, and means between the cylinders to connect this compartment to an exhaust passage when the charge has expanded to the limits of its compartment.

13. In a rotary device of the type described, in combination, a rotor, a cylinder eccentric to said rotor, a plurality of radially reciprocable partition plates extending between the rotor and cylinder and forming compartments whose size continuously changes during rotation, end members closing the cylinder and compartments and rotatable with the rotor, a spark plug for each compartment, one end plate having ports for said plugs radially inwardly of the periphery of said rotor, and a gas passage in said rotor at each compartment providing clearance for the inner end of each plug.

14. In a rotary internal combustion engine having a rotatable power cylinder and a rotatable compressor cylinder spaced apart on a shaft, said cylinders each having a plurality of compartments whose size continuously changes during rotation, and each cylinder having an end plate facing the space between the cylinders with a single port in each plate for each cylinder compartment, the combination of a manifold between said cylinders engaging both said end plates, a passage in said manifold to conduct combustible gas to the compressor cylinder, a passage to conduct exhaust gases from the power cylinder, a port for each passage to at times cooperate with the ports in the respective end plates as the cylinders rotate, and a transfer passage in said manifold having a port in each face thereof to cooperate at times with the said end plate ports for the transfer of gas from the compressor cylinder to the power cylinder.

ADOLPH H. WELLENSIEK.